(12) United States Patent
Song

(10) Patent No.: US 7,004,087 B2
(45) Date of Patent: Feb. 28, 2006

(54) HIGH TEMPERATURE GAS REFORMING CYCLO-INCINERATOR

(76) Inventor: Kwon-Kyu Song, 640, Kalhyun-dong, 427-100, Kwachon City, Kyunggi-do (KR)

( * ) Notice: Subject to any disclaimer, the term of this patent is extended or adjusted under 35 U.S.C. 154(b) by 0 days.

(21) Appl. No.: 10/497,246

(22) PCT Filed: Nov. 14, 2002

(86) PCT No.: PCT/KR02/02125

§ 371 (c)(1),
(2), (4) Date: Oct. 12, 2004

(87) PCT Pub. No.: WO03/048642

PCT Pub. Date: Jun. 12, 2003

(65) Prior Publication Data

US 2005/0039649 A1    Feb. 24, 2005

(30) Foreign Application Priority Data

Dec. 5, 2001  (KR) .................... 10-2001-0076619

(51) Int. Cl.
*F23J 15/00* (2006.01)
*F23J 3/00* (2006.01)

(52) U.S. Cl. .................. 110/235; 110/216; 110/203

(58) Field of Classification Search ................ 110/203, 110/210, 211, 212, 213, 214, 147, 148, 150, 110/157, 158, 159, 160, 161, 162, 163, 342, 110/344, 345, 235, 216
See application file for complete search history.

(56) References Cited

U.S. PATENT DOCUMENTS

| | | | | |
|---|---|---|---|---|
| 3,745,942 A | * | 7/1973 | Thompson et al. | 110/211 |
| 4,630,553 A | * | 12/1986 | Goetzman | 110/214 |
| 5,200,155 A | * | 4/1993 | Obermueller | 422/182 |
| 6,769,370 B1 | * | 8/2004 | Lee et al. | 110/259 |

* cited by examiner

*Primary Examiner*—Kenneth Rinehart
(74) *Attorney, Agent, or Firm*—Egbert Law Offices

(57) ABSTRACT

A high temperature gas reforming cyclo-incinerator, using reformed water and strongly swirling inlet air in its interior to burn up wastes. The incinerator has a dust collecting structure designed to almost completely remove circulating dust and other harmful impurities from air strongly swirling in the incinerator and discharge clean air to the atmosphere. Internal and external lower tubs have substantially larger diameters than those of internal and external upper tubs, thus effectively burning up a large quantity of wastes at one time. The incinerator is also provided with a flow rate control fan unit separate from a main fan unit, thus controlling the amount of inlet air as desired and allowing a user to control the incineration rate of wastes in the incinerator.

8 Claims, 8 Drawing Sheets

HIGH TEMPERATURE GAS REFORMING CYCLO-INCINERATOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates, in general, to high temperature gas reforming incinerators and, more particularly, to a high temperature gas reforming cyclo-incinerator, which has a dust collecting structure designed to almost completely remove circulating dust and other harmful impurities from air strongly swirling in the incinerator and discharge clean air to the atmosphere, and the lower tubs of which have substantially larger diameters than those of the upper tubs, thus effectively burning up a large quantity of wastes at one time, and which is provided with a flow rate control fan unit separate from a main fan unit, thus controlling the amount of inlet air as desired and allowing a user to control the incineration rate of wastes in the incinerator.

BACKGROUND OF THE INVENTION

Present-day cities generate a great quantity of wastes, such as domestic refuse, garbage and industrial wastes, which are not recyclable and are prohibited from being buried, but are combustible. The disposal of such wastes has been typically accomplished by incineration of them. In order to incinerate such wastes, large-scale incineration equipments are installed at designated areas of the cities.

However, the conventional large-scale incineration equipments are problematic in that they are accompanied by excessive costs for installation and operation of them, and generate exhaust gas laden with harmful substances, such as nitrogen oxides and dioxin, the contents of which exceed allowable levels to severely contaminate atmospheric air.

In an effort to overcome the problems experienced in such conventional large-scale incineration equipments, the inventor of this invention proposed "a gas reforming incinerator" as disclosed in Korean Patent Laid-open Publication No. 99-78939. The above gas reforming incinerator comprises an external lower tub, which is formed as a cylindrical body, with a flange provided at each end of the cylindrical body. First and second combustion chambers are provided in the external lower tub. The first combustion chamber has a combustion tub, which is provided with a flange at its lower end and an annular-shaped water supply pipe at its upper end. The second combustion chamber has an air feed tub, which is provided with both a flange at each end thereof and an air inlet hole at the sidewall thereof. A sub-combustion tub is received in the air feed tub. The gas reforming incinerator also has an external upper tub, which has a flange at each end thereof and receives therein a dust collecting tub with a dust collecting means.

The above conventional gas reforming incinerator is a new type of incinerator, which is preferably used for burning up a variety of combustible wastes, such as domestic refuses, waste plastics, waste rubber, waste food, waste tires, medical refuses, waste oil, and livestock wastes, which are not recyclable. This gas reforming incinerator almost completely burns up the wastes through pyrolysis using very high temperature heat of about 1,800° C., thus accomplishing complete combustion of the wastes without generating smoke or odor and thereby almost completely removing harmful gases, such as carbon monoxides, nitrogen oxides, or sooty smoke, from its exhaust gas.

However, such a conventional gas reforming incinerator is problematic in that it only allows inlet air to circulate in its interior for a short period of time even though it has a complex structure for creating the inlet air circulation. In addition, this gas reforming incinerator is inferior in its heat shielding function, thus sometimes causing a user to unexpectedly be burned by heat dissipated from its external surface. Another problem of the conventional gas reforming incinerator resides in that it is necessary to carry out complex processes to completely burn up incompletely burned wastes. Furthermore, the above incinerator undesirably discharges harmful dust along with exhaust gas to the atmosphere.

In an effort to overcome such problems experienced in the conventional gas reforming incinerator, the inventor of this invention also proposed "a high temperature gas reforming cyclo-incinerator" as disclosed in Korean Patent Application No. 2000-58235. The above high temperature gas reforming cyclo-incinerator comprises an air cooling structure designed to strongly swirl inlet air in the incinerator prior to discharging the air from the incinerator, thus increasing circulation time of the inlet air in the incinerator, and a heat shielding structure using a heat shielding plate designed to prevent heat dissipation from the external surface of the incinerator and protect a user from being burned by dissipated heat.

The high temperature gas reforming cyclo-incinerator also keeps a fire alive until wastes in the incinerator are completely burned up, feeds fuel to completely incinerate incompletely burned wastes, and collects and temporarily stores dust-laden air generated from the combustion of the wastes prior to filtering the air to remove dust from the air and discharging clean air to the atmosphere.

However, such a conventional high temperature gas reforming cyclo-incinerator is problematic in that dust and other harmful impurities strongly swirl along with air strongly swirling along the inner surface of the incinerator during the operation of the incinerator, thus being discharged to the atmosphere through an exhaust pipe. In addition, it is difficult to control the flow rate of air into the internal lower tub, so that the incineration rate of wastes in the incinerator is not easily controlled. Furthermore, it is impossible for the incinerator to burn up a large quantity of wastes at one time, so that a user of the incinerator is forced to frequently add small quantities of wastes into the incinerator. The conventional high temperature gas reforming cyclo-incinerator is thus inconvenient to the user.

BRIEF SUMMARY OF THE INVENTION

Accordingly, the present invention has been made keeping in mind the above problems occurring in the prior art, and an object of the present invention is to provide a high temperature gas reforming cyclo-incinerator, which has a dust collecting structure designed to almost completely remove circulating dust and other harmful impurities from air strongly swirling in the incinerator and discharge clean air to the atmosphere, and the lower tubs of which have substantially larger diameters than those of the upper tubs, thus effectively burning up a large quantity of wastes at one time, and which is provided with a flow rate control fan unit separate from a main fan unit, thus controlling the amount of inlet air as desired and allowing a user to control the incineration rate of wastes in the incinerator.

In an aspect, the present invention provides a high temperature gas reforming cyclo-incinerator, comprising: a cylindrical internal exhaust tub; an external exhaust tub axially receiving the internal exhaust tub therein; an internal upper tub having a cylindrical tub body, with an exhaust pipe axially extending upward from the tub body, a shoulder formed at a lower end of the exhaust pipe and integrated with an upper end of the tub body into a single structure, and a plurality of exhaust ports formed around the upper end of a sidewall of the tub body; an external upper tub connected at an upper end thereof to the external exhaust tub, with an internal support rim formed in the external upper tub to seat a stop rim of the internal upper tub thereon; an external lower tub connected at an upper end thereof to a lower end of the external upper tub, with an external intake opening formed on a sidewall of the external lower tub and closed by an external intake door having a window, an air inlet port formed on the sidewall of the external lower tub at a position opposite to the external intake opening, an external ash outlet opening formed at a lower portion of the external lower tub and closed by an ash outlet door, and a dust collecting port formed on the lower portion of the external lower tub at a position opposite to the ash outlet opening; and an internal lower tub received in the external lower tub and having an internal ash outlet opening at a position aligned with the external ash outlet opening of the external lower tub, with a plurality of inlet ports formed at upper and lower portions of the internal lower tub respectively connected to a reformed water inlet pipe and first and second fuel inlet pipes, and a water collector set in a lower portion of the internal lower tub, further comprising: an internal dust collecting tub opened at a top thereof and set in an upper portion of the internal upper tub such that a dust chamber is defined between the internal dust collecting tub and the internal upper tub, with a plurality of dust collecting ports formed on a sidewall of the internal dust collecting tub, the internal dust collecting tub being mounted at a lower edge thereof to an upper portion of an inner surface of the internal upper tub; a dust outlet port formed on a sidewall of the internal upper tub at a position corresponding to a lower portion of the dust chamber defined between the internal dust collecting tub and the internal upper tub, thus discharging dust from the dust chamber to the outside of the internal upper tub due to a swirling force of air; a dust outlet pipe connected to the dust outlet port of the internal upper tub, and extending to the outside of the internal upper tub; a locking port formed at a sidewall of the external upper tub to hermetically support the dust outlet pipe; a dust guide pipe hermetically connected to the locking port of the external upper tub to downwardly guide dust discharged from the dust chamber through the dust outlet pipe; and a micro-dust collecting tub connected to the dust guide pipe so as to collect dust guided by the dust guide pipe.

In another aspect, the present invention provides a high temperature gas reforming cyclo-incinerator, comprising: a cylindrical internal exhaust tub; an external exhaust tub axially receiving the internal exhaust tub therein; an internal upper tub having a cylindrical tub body, with an exhaust pipe axially extending upward from the tub body, a shoulder formed at a lower end of the exhaust pipe and integrated with an upper end of the tub body into a single structure, and a plurality of exhaust ports formed around the upper end of a sidewall of the tub body; an external upper tub connected at an upper end thereof to the external exhaust tub, with an internal support rim formed in the external upper tub to seat a stop rim of the internal upper tub thereon; an external lower tub connected at an upper end thereof to a lower end of the external upper tub, with an external intake opening formed on a sidewall of the external lower tub and closed by an external intake door having a window, an air inlet port formed on the sidewall of the external lower tub at a position opposite to the external intake opening, an external ash outlet opening formed at a lower portion of the external lower tub and closed by an ash outlet door, and a dust collecting port formed on the lower portion of the external lower tub at a position opposite to the ash outlet opening; and an internal lower tub received in the external lower tub and having an internal ash outlet opening at a position aligned with the external ash outlet opening of the external lower tub, with a plurality of inlet ports formed at upper and lower portions of the internal lower tub respectively connected to a reformed water inlet pipe and first and second fuel inlet pipes, and a water collector set in a lower portion of the internal lower tub, further comprising: a sealing member externally provided around a lower portion of a sidewall of the internal lower tub and mounted to a lower portion of the sidewall of the external lower tub, thus sealing a gap between the internal lower tub and the external lower tub; a flow rate control fan unit introducing external air into the external lower tub through a first flow rate control port formed at the sidewall of the external lower tub; a plurality of second flow rate control ports formed at a lower portion of the internal lower tub; and an air guide tub extending outwardly from a lower end of the internal lower tub and bent upward to surround the lower portion of the internal lower tub at a position outside the second flow rate control ports, thus guiding external air from the first flow rate control port to the second flow rate control ports.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawings.

DETAILED DESCRIPTION OF THE INVENTION

Figure 1:
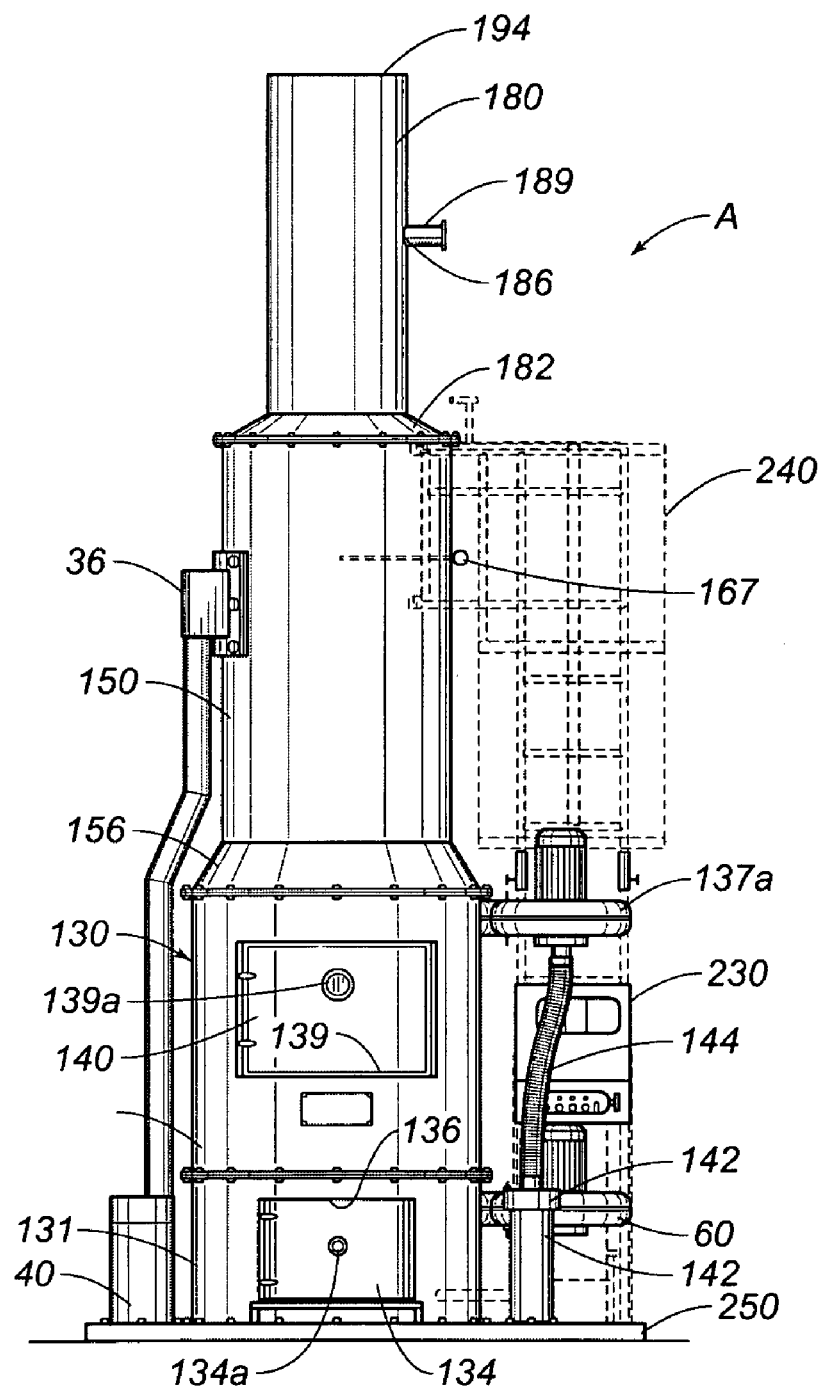
FIG. 1 is a front elevation view of a high temperature gas reforming cyclo-incinerator in accordance with a primary embodiment of the present invention.

Reference now should be made to the drawings, in which the same reference numerals are used throughout the different drawings to designate the same or similar components.

FIG. 1 is a front view of a high temperature gas reforming cyclo-incinerator in accordance with a primary embodiment of the present invention.

Figure 2:
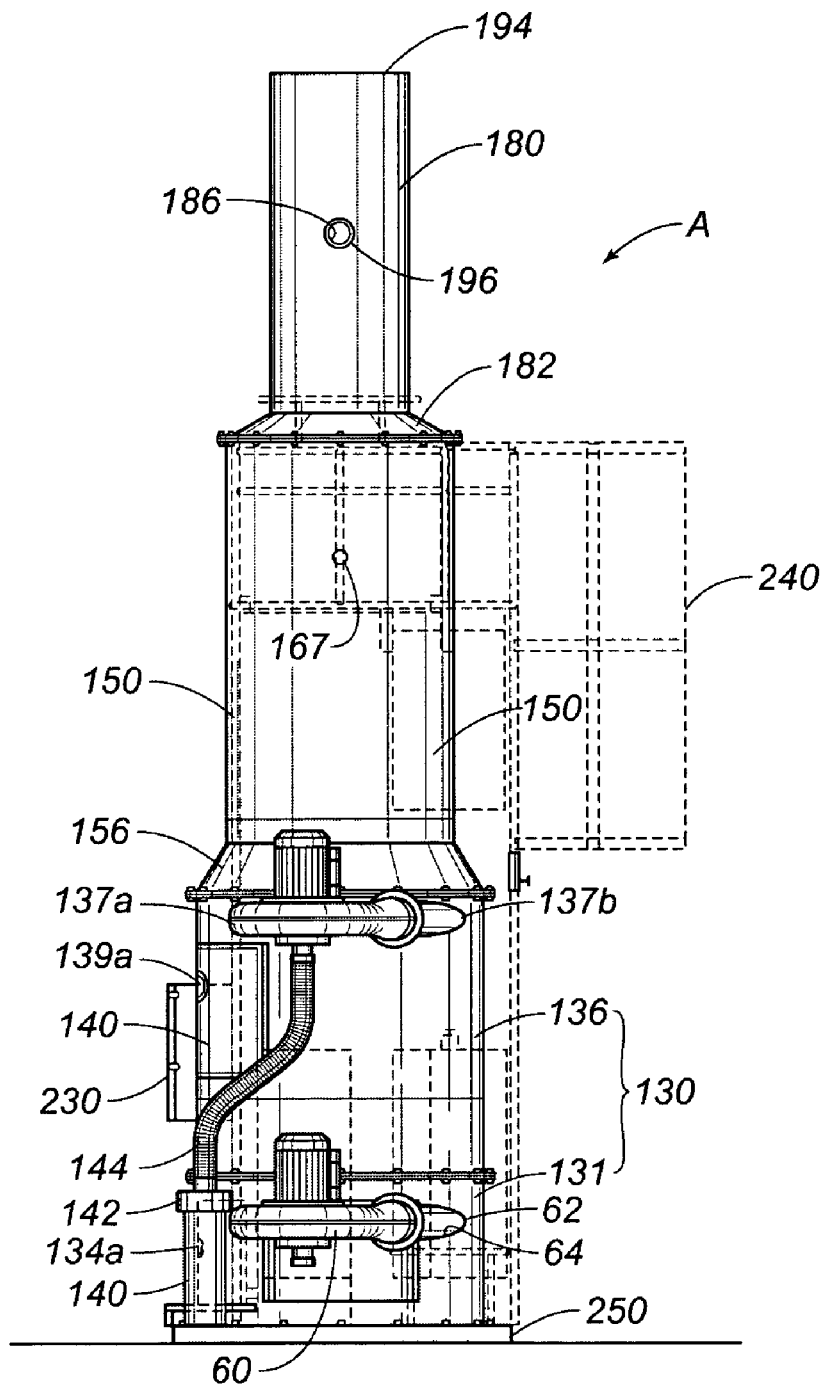
FIG. 2 is a right-side elevation view of the incinerator according to the primary embodiment of the present invention.
Figure 3:
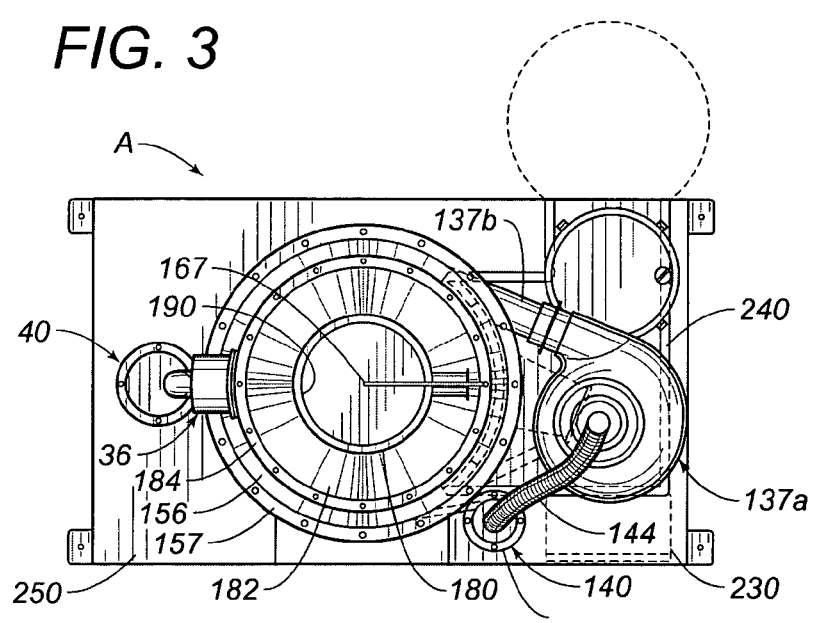
FIG. 3 is a top plan view of the incinerator according to the primary embodiment of the present invention.
Figure 4:
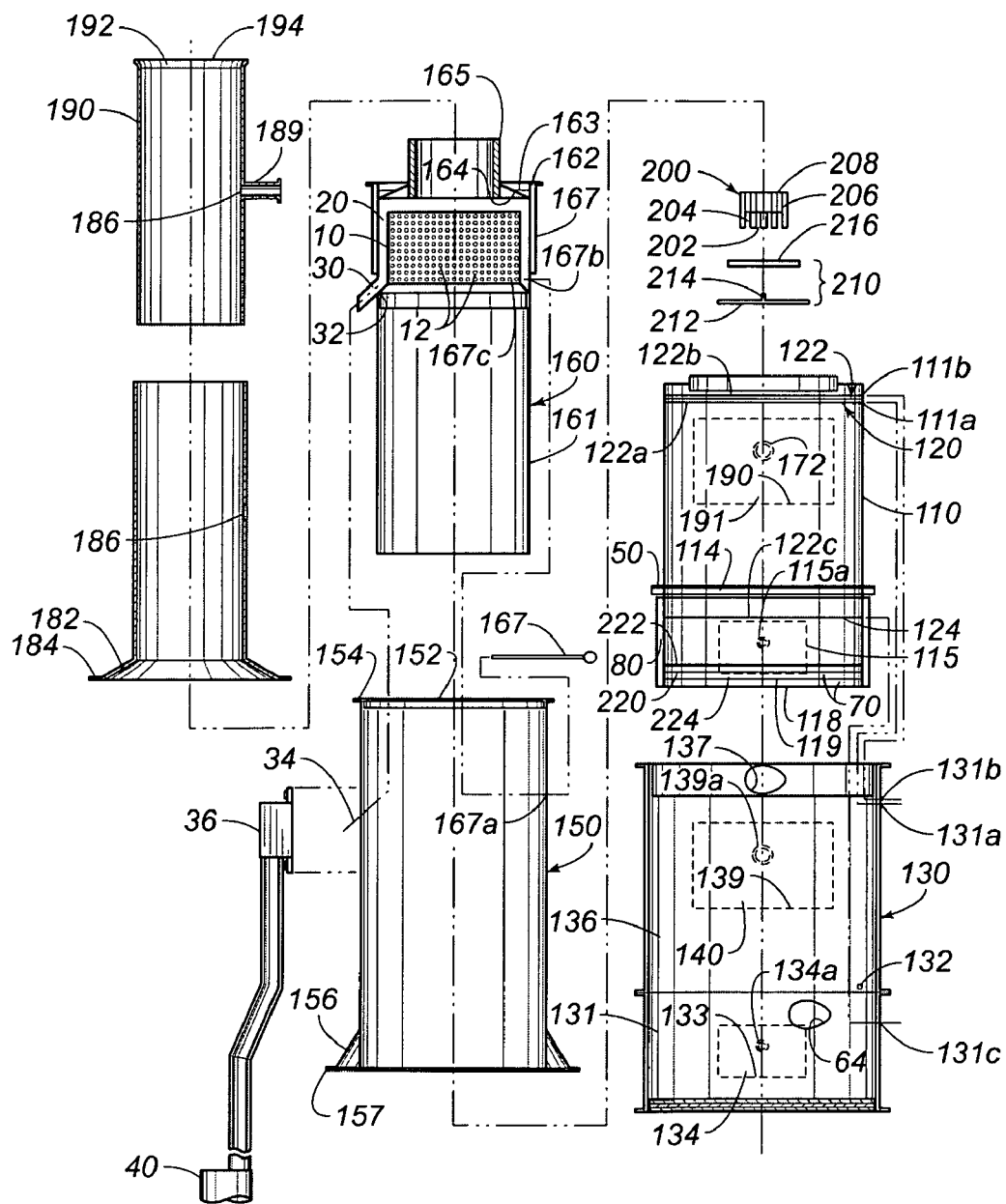
FIG. 4 is an exploded sectional view of the incinerator according to the primary embodiment of the present invention.
Figure 5:
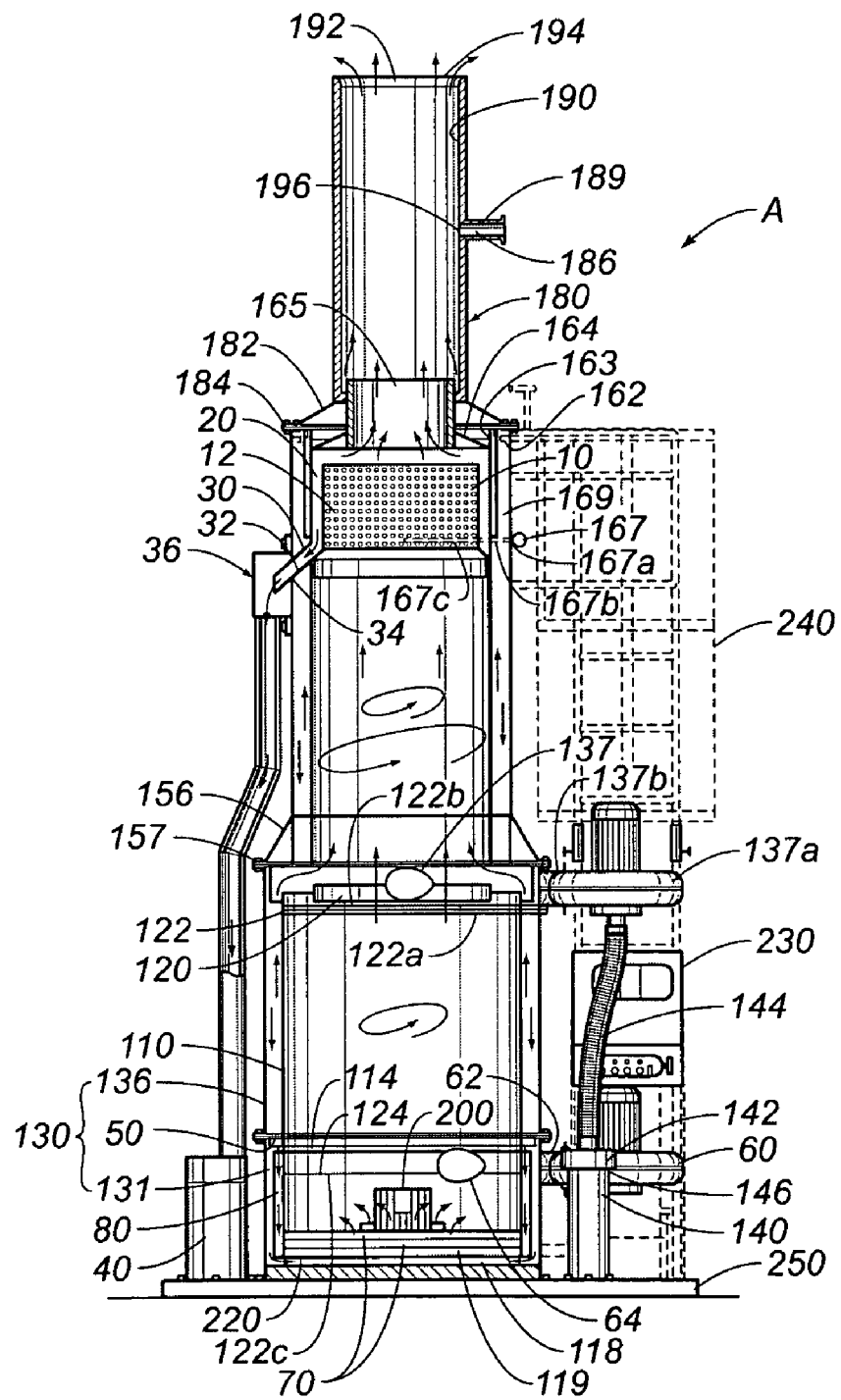
FIG. 5 is a sectional view illustrating an operation of the incinerator according to the primary embodiment of the present invention.
Figure 6:
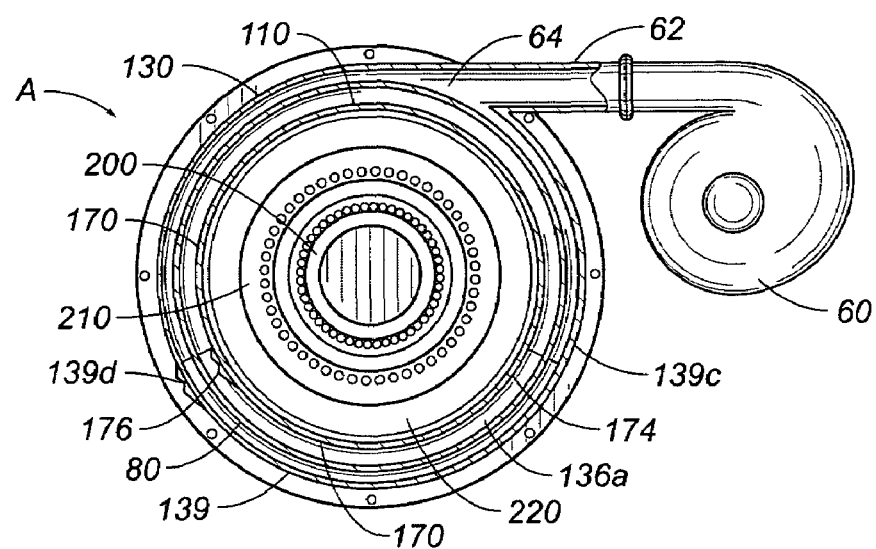
FIG. 6 is a partially sectioned plan view of the incinerator according to the primary embodiment of the present invention.
Figure 7:
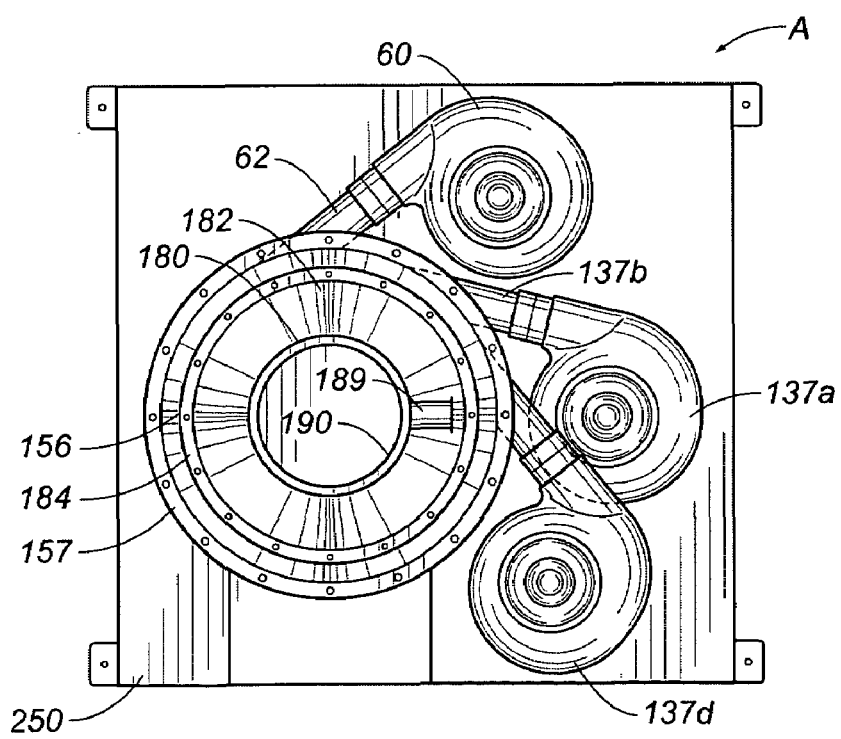
FIG. 7 is a top plan view of a high temperature gas reforming cyclo-incinerator in accordance with a second embodiment of the present invention.

FIG. 2 is a right-side view of the incinerator. FIG. 3 is a plan view of the incinerator. FIG. 4 is an exploded sectional view of the incinerator. FIG. 5 is a sectional view illustrating an operation of the incinerator. FIG. 6 is a partially sectioned plan view of the incinerator. FIG. 7 is a plan view of a high temperature gas reforming cyclo-incinerator in accordance with a second embodiment of the present invention.

As shown in the drawings, the high temperature gas reforming cyclo-incinerator "A" comprises an internal exhaust tub 190 and an external exhaust tub 180, which are used for exhausting combustion gases from the incinerator to the atmosphere. The incinerator also has an internal upper tub 160 and an external upper tub 150, which both serve to rapidly swirl combustion gases therein while centrifugally removing micro-dust from the gases to discharge the collected dust to the outside, and guide clean gases along with heat to the internal exhaust tub 190 and the external exhaust tub 180 so as to exhaust the gas and heat to the atmosphere. The incinerator further includes an internal lower tub 110 and an external lower tub 130, through both of which a passage is formed for allowing wastes to be put into the incinerator, define a combustion chamber for completely burning up the wastes using appropriately controlled fuel and reformed water while creating rapid swirling flow of air therein and appropriately controlling the flow rate of air using a flow rate control fan unit 60, and from which ashes are discharged to the outside of the incinerator.

The external exhaust tub 180 comprises a cylindrical body, which has a skirt 182 at its lower end with a lower flange 184 formed along the outside edge of the skirt 182. A first sensor fitting hole 186 is formed at the middle portion of the cylindrical sidewall of the external exhaust tub 180, and receives an exhaust gas sensor holder 189 therein.

The internal exhaust tub 190 comprises a cylindrical body, which is provided with a top flange 194 along its upper end. This internal exhaust tub 190 is axially received into the external exhaust tub 180 until the top flange 194 is seated on the upper end of the external exhaust tub 180. A plurality of exhaust ports 192 are formed around the circumferential surface of the upper end of the internal exhaust tub 190. A second sensor fitting hole 196 is formed at the middle portion of the cylindrical sidewall of the internal exhaust tub 190, and receives the inside end of the exhaust gas sensor holder 189.

The internal upper tub 160 has a cylindrical tub body 161, with an exhaust pipe 165 axially extending from the upper end of the tub body 161 and an internal dust collecting tub 10 opened at its top and set in an upper portion of the tub body 161. A shoulder 164 is formed at the lower end of the exhaust pipe 165, and is integrated with the upper end of the cylindrical tub body 161 into a single structure.

A third sensor fitting hole 167a is formed at the cylindrical sidewall of the internal upper tub 160, and receives a temperature sensor 167. A dust outlet port 32 is formed at the sidewall of the internal upper tub 160 at a position diametrically opposite to the third sensor fitting hole 167a.

A stop rim 162 is formed around the upper end of the tub body 161, while a plurality of exhaust ports 163 are formed around the upper end of the sidewall of the tub body 161 at positions under the stop rim 162. A heat shielding plate 168 surrounds the upper portion of the tub body 161 at a position under the stop rim 162.

The internal dust collecting tub 10 having a smaller diameter is set in the upper portion of the tub body 161 having a larger diameter. A fourth sensor fitting hole 167b is formed at a lower portion of the cylindrical sidewall of the internal dust collecting tub 10, and receives the temperature sensor 167.

The external upper tub 150 comprises a cylindrical body, with an upper flange 154 externally formed at the upper end of the external upper tub 150. The external upper tub 150 also has an internal support rim 152 for seating the stop rim 162 of the internal upper tub 160 thereon. A locking port 34 is formed at the sidewall of the external upper tub 150 and hermetically supports a dust outlet pipe 30. An upper end of the dust outlet pipe 30 is connected to the dust outlet port 32 of the internal upper tub 160.

The dust outlet pipe 30 is connected at a lower end thereof to a dust guide pipe 36 at the locking port 34. The dust guide pipe 36 is also connected to a micro-dust collecting tub 40 positioned at the base plate 250 of the incinerator "A", thus guiding micro-dust from the internal dust collecting tub 10 to the micro-dust collecting tub 40.

The external upper tub 150 has a skirt 156 at its lower end with a lower flange 157 formed along the outside edge of the skirt 156.

The internal lower tub 110 comprises a cylindrical body, with a plurality of inlet ports 111a, 111b and 111c formed at the upper and lower portions of the cylindrical sidewall of the internal lower tub 110. An internal ash outlet opening 115 is formed at the lower portion of the internal lower tub 110, and is covered with a window 115a. A perforated plate 118, having a plurality of through holes 118a, is fixedly mounted at the lower end of the internal lower tub 110 at a position above a base plate 250.

An internal intake opening 170 is formed at the middle portion of the internal lower tub 110. An internal intake door 171 having a transparent window 172 is rotatably mounted to the edge of the intake opening 170 using hinges 174, and is openably locked to the internal lower tub 110 using a locking member 176.

A water collector 114 is connected to the middle portion of the internal lower tub 110. A plurality of water outlet ports 111d are formed around the cylindrical sidewall of the internal lower tub 110 at positions under the lower end of the water collector 114. The reformed water introduced into the internal lower tub 110 through the water outlet ports 111d is decomposed into oxygen molecules and carbons in the internal lower tub 110, thus allowing a complete combustion of wastes in the incinerator.

A plurality of flow rate control ports 70 are formed around the lower portion of the sidewall of the internal lower tub 110, while an air guide tub 80 extends outwardly from the lower end of the internal lower tub 110 and is bent upward to surround the lower portion of the internal lower tub 110 at a position outside the control ports 70.

The perforated plate 118, having the through holes 118a, is fixedly mounted at the lower end of the internal lower tub 110, while a firebrick stack 119 is formed at the lower portion inside the internal lower tub 110 at a position between the control ports 70 and the perforated plate 118.

A band-shaped sealing member 50 is externally provided around the sidewall of the internal lower tub 110 having the water collector 114, thus sealing the gap between the internal lower tub 110 and the external lower tub 130 while allowing the through holes 118a of the perforated plate 118 mounted at the lower end of the internal lower tub 110 to communicate with the control ports 70.

The external lower tub 130 is fitted over the internal lower tub 110, and comprises an upper cylindrical body 136 and a lower cylindrical body 131.

The upper body 136 of the external lower tub 130 has an air inlet port 137 at the central portion of its cylindrical sidewall, with an external intake opening 139 formed on the sidewall of the upper body 136 at a position diametrically opposite to the air inlet port 137. An external intake door 139a having a transparent window 139b is rotatably mounted to the edge of the external intake opening 139 using hinges 139c, and is openably locked to the upper body 136 using a locking member 139d. A plurality of inlet ports 131a and 131b are formed at the upper portion of the cylindrical sidewall of the upper body 136.

The upper end of the lower body 131 of the external lower tub 130 is connected to the lower end of the upper body 136, with an ash outlet opening 133 formed at the lower portion of the lower body 131. A slidable ash outlet door 134 having a window 134a covers the ash outlet opening 133, while an inlet port 131c is formed at the upper portion of the cylindrical sidewall of the lower body 131.

A dust collecting port 132 is formed on the lower portion of the upper body 136 of the external lower tub 130, and is connected to a circulating dust collecting tub 140 through a dust guide pipe.

A firebrick stack is formed at the lower portion inside the external lower tub 130, thus preventing an undesired dissipation of heat from the external lower tub 130 to the outside.

Two annular-shaped fuel inlet pipes 122 and 124 receive fuel from an external fuel tank (not shown), and spray the fuel through their nozzles 122b and 122c at the upper and lower portions of the interior of the internal lower tub 110 so as to accomplish complete combustion of wastes. The two fuel inlet pipes 122 and 124 are fixedly set in the upper and lower portions inside the internal lower tub 110, respectively, and are commonly connected to the external fuel tank (not shown) through the inlet ports 111b and 111c of the internal lower tub 110 and the inlet ports 131b and 131c of the external lower tub 130. In the present invention, it is preferable to use waste oil as the fuel.

Figure 9:
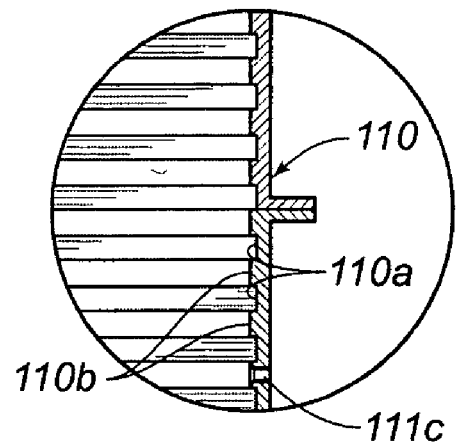
FIG. 9 is a partially enlarged side sectional view illustrating an internal lower tub of the incinerator in accordance with another embodiment of the present invention.

FIG. 9 is a partially enlarged side sectional view illustrating an internal lower tub of the incinerator in accordance with another embodiment of the present invention. In the present invention, the fuel inlet pipe 124 provided at the lower portion inside the internal lower tub 110 sprays waste oil through its nozzles 122c to burn up wastes. However, in order to more effectively burn up wastes, the internal surface of the sidewall of the internal lower tub 110 may be designed such that it has a structure capable of more effectively vaporizing the waste oil. That is, as shown in FIG. 9, a plurality of band-shaped depressions 110a and projections 110b may be alternately and horizontally formed around the internal surface of the sidewall of the internal lower tub 110 at an area under the fuel inlet pipe 124 so as to delay the flow of waste oil which flows down along the internal surface of the internal lower tub 110 after being sprayed from the nozzles 122c of the fuel inlet pipe 124. In such a case, waste oil, sprayed from the nozzles 122c of the fuel inlet pipe 124, flows down along the alternately arranged depressions 110a and projections 110b on the internal surface of the internal lower tub 110, and so the flow of the waste oil is delayed. The waste oil in the internal lower tub 110 is thus more effectively vaporized, thus being almost completely burnt up.

An annular-shaped reformed water inlet pipe 120 receives reformed water from an external reformed water tank (not shown), and sprays the reformed water through its nozzles 122a at the upper portion of the interior of the internal lower tub 110, thus accomplishing complete combustion of the wastes. The reformed water inlet pipe 120 is fixedly set in the upper portion inside the internal lower tub 110, and is connected to the external reformed water tank (not shown) through the inlet port 111a of the internal lower tub 110 and the inlet port 131a of the external lower tub 130.

A disc-shaped positioning plate 220, having a seating opening 222 at its central portion, is mounted to the lower end of the internal lower tub 110. This positioning plate 220 also has a plurality of locking pieces 224, which are formed on the lower surface of the plate 220 and partially project into the opening 222.

A fire grate 210 is seated on the seating opening 222 of the positioning plate 220. This fire grate 210 comprises a disc-shaped body provided with a plurality of through holes 212. A guide ring 216 is concentrically mounted to the upper surface of the fire grate 210, while a positioning pipe 214 is mounted to the center of the fire grate 210.

A flame stabilizer 200 is mounted to the upper surface of the fire grate 210, and is used for maintaining the flame of the fire grate 210 for a desired lengthy period of time. This flame stabilizer 200 comprises an annular upper plate 208, with a plurality of support pipes 206 vertically mounted along the edge of the lower surface of the upper plate 208. In the cylindrical space defined by the support pipes 206, a disc-shaped lower plate 204 is mounted to the middle portions of the support pipes 206 at its outside edge. A positioning piece 202 is mounted to the center of the lower surface of the lower plate 204. The positioning piece 202 is fitted into the positioning pipe 214 of the fire grate 210.

FIG. 6 is a partially sectioned plan view of the incinerator according to the primary embodiment of the present invention. As shown in the drawing, an air guide pipe 62 extending from the flow rate control fan unit 60 is tangentially connected to a flow rate control port 64 formed at the cylindrical sidewall of the lower body 131 of the external lower tub 130. Therefore, external air fed from the control fan unit 60 primarily passes through the gap between the internal lower tub 110 and the air guide tub 80, and secondarily passes through the control ports 70 formed at the lower portion of the internal lower tub 110 or the through holes 118a of the perforated plate 118, thus being supplied to the wastes laid on the disc-shaped positioning plate 220 while being controlled in its flow rate. It is thus possible to control the amount of inlet air supplied to the wastes and to control the incineration rate of wastes in the incinerator, as desired.

In the incinerator of the present invention, the internal intake door 171 and the external intake door 139a are respectively hinged to the edges of the intake openings 170 and 139 of the internal lower tub 110 and the external lower tub 130 using the hinges 174 and 139c, and are openably locked to the tubs 110 and 130 using the locking members 176 and 139d. Of course, the two intake openings 170 and 139 are aligned with each other.

A support plate 136a closes the lower end of the annular gap defined between the internal intake door 171 of the internal lower tub 110 and the external intake door 139a of the external lower tub 130, and so input wastes are not dropped to the lower portion of the space between the cylindrical tub bodies of the internal and external lower tubs 110 and 130, but desirably slide into the interior of the internal lower tub 110.

While burning up wastes in the external lower tub 130, heat generated from the combustion of the wastes is dissipated to the outside by inlet air, which is introduced into the external lower tub 130 through the control port 64 and the air inlet port 137 by the suction force generated from the control fan unit 60 and a main fan unit 137a installed outside the external lower tub 130, and strongly swirls in the external lower tub 130.

The dust collecting port 132, formed at the external lower tub 130, is connected to the circulating dust collecting tub 140 through the dust guide pipe, and guides dust from the incinerator "A" to the circulating dust collecting tub 140 due to strong swirling force of the air in the external lower tub 130.

In such a case, it is preferred to connect the top of a lid 142 of the circulating dust collecting tub 140 to a first end of a connecting pipe 144. The second end of the connecting pipe 144 is connected to a housing of the main fan unit 137a, thus guiding air filtered by an air filter 146 to the interior of the incinerator "A".

The above high temperature gas reforming cyclo-incinerator "A" of the present invention is operated as follows.

When it is desired to burn up, using the incinerator of this invention, a variety of combustible wastes, such as domestic refuses, waste plastics, waste rubber, waste food, waste tires, medical refuses, waste oil, and livestock wastes, which are not recyclable, a user opens the external intake door 139a of the external lower tub 130 of the incinerator "A" installed on the base plate 250, thus opening the external intake opening 139. Thereafter, the user opens the internal intake door 171 of the internal lower tub 110, thus opening the internal intake opening 170.

In order to open the two doors 139a and 171, the user releases the locking members 139d and 176 and rotates the doors 139a and 171 around the hinges 139c and 174.

After opening the two intake openings 139 and 170, the user inputs a desired quantity of wastes into the incinerator "A" through the two intake opening 139 and 170 such that the input wastes are stacked at a position above the positioning plate 220, the fire grate 210 and the flame stabilizer 200 in the internal lower tub 110. Thereafter, the input wastes are ignited using a manual igniter or an automatic igniter (not shown). After the ignition of the wastes, the two intake doors 171 and 139a are sequentially closed prior to locking the doors 171 and 139a using the locking members 176 and 139d, thus completely closing the two intake openings 170 and 139.

In the high temperature gas reforming cyclo-incinerator "A" of the present invention, the internal lower tub 110 and the external lower tub 130 are designed such that their diameters are substantially larger than those of the internal upper tub 160 and the external upper tub 150, different from a conventional high temperature gas reforming cyclo-incinerator. Therefore, it is possible to effectively burn up a large quantity of wastes at one time in the incinerator "A" of the present invention.

After igniting the wastes and completely closing the two intake openings 170 and 139, the user controls a control panel 230 of the incinerator "A" to turn on the main fan unit 137a and the control fan unit 60, thus forcibly feeding external air into the incinerator "A" through the air inlet port 137 and the control port 64 while controlling the flow rate of air into the incinerator "A", as desired. At the same time, a predetermined quantity of reformed water is fed from the external reformed water tank (not shown) into the internal lower tub 110 through the nozzles 122 of the reformed water inlet pipe 120.

The reformed water, sprayed into the internal lower tub 110 from the nozzles 122 of the reformed water inlet pipe 120 set in the upper portion of the internal lower tub 110, greatly increases humidity inside the incinerator "A". In such a case, the external air having a relatively lower temperature than that of the reformed water rapidly swirls around the external surface of the sidewall of the internal lower tub 110, and so reformed water drops are formed on the internal surface of the sidewall of the internal lower tub 110 and flow down said internal surface. The reformed water drops are thus decomposed into oxygen molecules and carbons while flowing down the internal surface of the sidewall of the internal lower tub 110.

When the reformed water flows to the lower portion of the internal lower tub 110, the reformed water is dropped onto the firebrick stack 119 formed at the lower portion inside the internal lower tub 110. In such a case, the firebrick stack 119 is heated by radiant heat, and so a part of the reformed water is vaporized to generate steam and the steam flows upward through the through holes 212 of the fire grate 210.

In the operation of the incinerator, external air is forcibly fed from the main fan unit 137a into the internal lower tub 110 through the air inlet port 137 of the external lower tub 130. The external air strongly swirls in the external lower tub 130 in a counterclockwise direction to form strong vortex flow since the air tangentially flows into the external lower tub 130. In such a case, a part of the inlet air swirls upward to the external upper tub 150. The remaining part of the inlet air swirls downward to the lower portion of the external lower tub 130, and is heated by high temperature heat, thus swirling upward to be introduced into the internal upper tub 160 and the internal lower tub 110.

FIG. 7 is a plan view of a high temperature gas reforming cyclo-incinerator in accordance with a second embodiment of the present invention. As shown in the drawing, two main fan units 137a and 137a' may be separately installed at an upper portion of the upper body 136 of the external lower tub 130 so as to increase the swirling force of the external air introduced into the internal lower tub 110. In such a case, the inlet air more rapidly swirls in the internal lower tub 110.

The inlet air, rapidly and continuously flowing into both the internal upper tub 160 and the internal lower tub 110 and counterclockwise swirling in the two tubs 160 and 110, is mixed with the atomized reformed water sprayed from the nozzles 122 of the water inlet pipe 120, and rapidly swirls counterclockwise in the gap between the external lower tub 130 and the internal upper tub 160 and in the spaces inside the internal upper tub 160 and the internal lower tub 110.

The rapidly swirling inlet air, having a low temperature, is introduced into the upper body 136 of the external lower tub 130, and rapidly swirls in the gap between the external upper tub 150 and the internal upper tub 160 and in the gap between the external lower tub 130 and the internal lower tub 110 while being heated to a high temperature.

The hot air rapidly swirls upward to the external upper tub 150, and is introduced into the spaces inside the internal upper tub 160 and the internal lower tub 110 so as to rapidly swirl upward in the spaces. In such a case, the hot air swirling upward in the internal upper tub 160 comes into contact with the sidewall of the internal upper tub 160. The sidewall of the internal upper tub 160 is cooled by the inlet air newly fed from the main fan unit 137a to the external surface of said sidewall, and so the hot air inside the internal upper tub 160 is cooled by the sidewall of the internal upper tub 160 and becomes cool air flowing downward in the internal upper tub 160.

The cool air flowing downward in the internal upper tub 160 is introduced into the internal lower tub 110, and is heated in the internal lower tub 110 to become hot air. This hot air rapidly swirls upward in the internal lower tub 110.

The inlet air, introduced into the incinerator "A", thus repeatedly circulates in the incinerator "A".

During the incineration of wastes in the incinerator of the present invention, micro-dust laden in the air strongly swirling in the upper portion of the internal upper tub 160 is centrifugally discharged to a dust chamber 20, which is defined between the internal dust collecting tub 10 and the internal upper tub 160, through a plurality of dust collecting ports 12 formed on the sidewall of the internal dust collecting unit 10, and is secondarily discharged from the dust chamber 20 to the outside of the internal upper tub 160 through the dust outlet pipe 30 connected to the dust outlet port 32 formed at the internal upper tub 160. The micro-dust discharged from the internal upper tub 160 through the dust outlet pipe 30 is, thereafter, guided to the micro-dust collecting tub 40 through the dust guide pipe 36, thus being collected in the micro-dust collecting tub 40.

Therefore, combustion gases generated from the combustion of wastes in the incinerator "A" repeatedly circulate in the incinerator for a desired lengthy period of time while being mixed with inlet air, and so the combustion gases repeatedly come into contact with hot air of about 1,800° C. in the incinerator to be almost completely decomposed through pyrolysis. That is, the combustion gases are completely burned up, and exhaust gas from the incinerator is not likely to include harmful gases.

In addition, inlet air rapidly swirls in the gap between the external upper tub 150 and the internal upper tub 160 and in the gap between the internal lower tub 110 and the external lower tub 130. Therefore, the external surfaces of the sidewalls of both the external upper tub 150 and the external lower tub 130 are not excessively heated, and so it is possible to prevent a user from being burned even though the user touches the external surfaces of the two external tubs 130 and 150.

A part of inlet air rapidly swirling in the gap between the external upper tub 150 and the internal upper tub 160 is exhausted from the incinerator to the atmosphere as exhaust gas. In such a case, a part of the exhaust gas sequentially passes through the gap between the heat shielding plate 168 of the internal upper tub 160 and the upper portion of the tub body 161, the exhaust ports 163 formed at the upper end of the tub body 161, and the gap between the external surface of the external exhaust tub 180 and the internal surface of the internal exhaust tub 190 prior to being discharged to the atmosphere. The remaining part of the exhaust gas sequentially passes through the gap between the external exhaust tub 180 and the internal exhaust tub 190 and the exhaust ports 192 formed at the upper end of the internal exhaust tub 190 prior to being discharged to the atmosphere.

When burning up the wastes in the incinerator of the present invention, inlet air mixed with reformed water is fed into the internal lower tub 110, and undergoes chemical reactions, that is, a pyrolytic reaction (reforming reaction) expressed by the reaction formula $\{C, H+H_2O \rightarrow CO+H_2\}$, and a combustion reaction expressed by the reaction formula $\{(CO+H_2)+O_2 \rightarrow CO_2+H_2O\}$, in the incinerator, thus supplying plentiful oxygen ($O_2$) to the flame in the internal lower tub 110. The temperature of the flame of the wastes is thus increased to a very high point of about 1,800° C. at its center, thus accomplishing complete combustion of the wastes through pyrolysis.

Due to the pyrolysis, exhaust gas discharged from the incinerator of the present invention is not likely to include smoke, dust, and harmful substances, such as CO, $NO_x$, $SO_x$ and dioxin. That is, during incineration of wastes in the incinerator "A" of the present invention, thermal energy generated from the incineration vaporizes water and performs destructive distillation in which solid organic materials are subjected to pyrolysis to be divided into volatile materials and nonvolatile materials. In addition, inlet air rapidly and repeatedly swirls upward and downward in the incinerator, and so combustion gases are completely burned up in the incinerator before they are exhausted from the incinerator to the atmosphere. Therefore, exhaust gas discharged from the internal exhaust tub 190 of the incinerator is free from smoke, odor or color.

During the incineration of wastes in the incinerator of the present invention, dust-laden air is guided from the upper body 136 of the external lower tub 130 into the circulating dust collecting tub 140 through the dust guide pipe connecting the dust collecting port 132 of the external lower tub 130 to the circulating dust collecting tub 140, and so dust is removed from the air before the air is discharged from the incinerator to the atmosphere. In such a case, the dust collecting port 132 is formed on the external lower tub 130 such that the port 132 opens in a direction opposite to the swirling direction of the inlet air in the external lower tub 130. The dust-laden air rapidly swirls along with the inlet air in the external lower tub 130, prior to being discharged to the circulating dust collecting tub 140 through the dust collecting port 132.

The air laden with dust, discharged from the external lower tub 130 through the dust collecting port 132, is fed to the lower portion of the circulating dust collecting tub 140. In the circulating dust collecting tub 140, heavy dust and impurities are collected in the lower portion of the dust collecting tub 140 around the dust guide pipe, and air is discharged from the dust collecting tub 140 to the housing of the main fan unit 137a through the connecting pipe 144 extending from the lid 142 of the dust collecting tub 140, after being filtered by the air filter 146.

Figure 8:
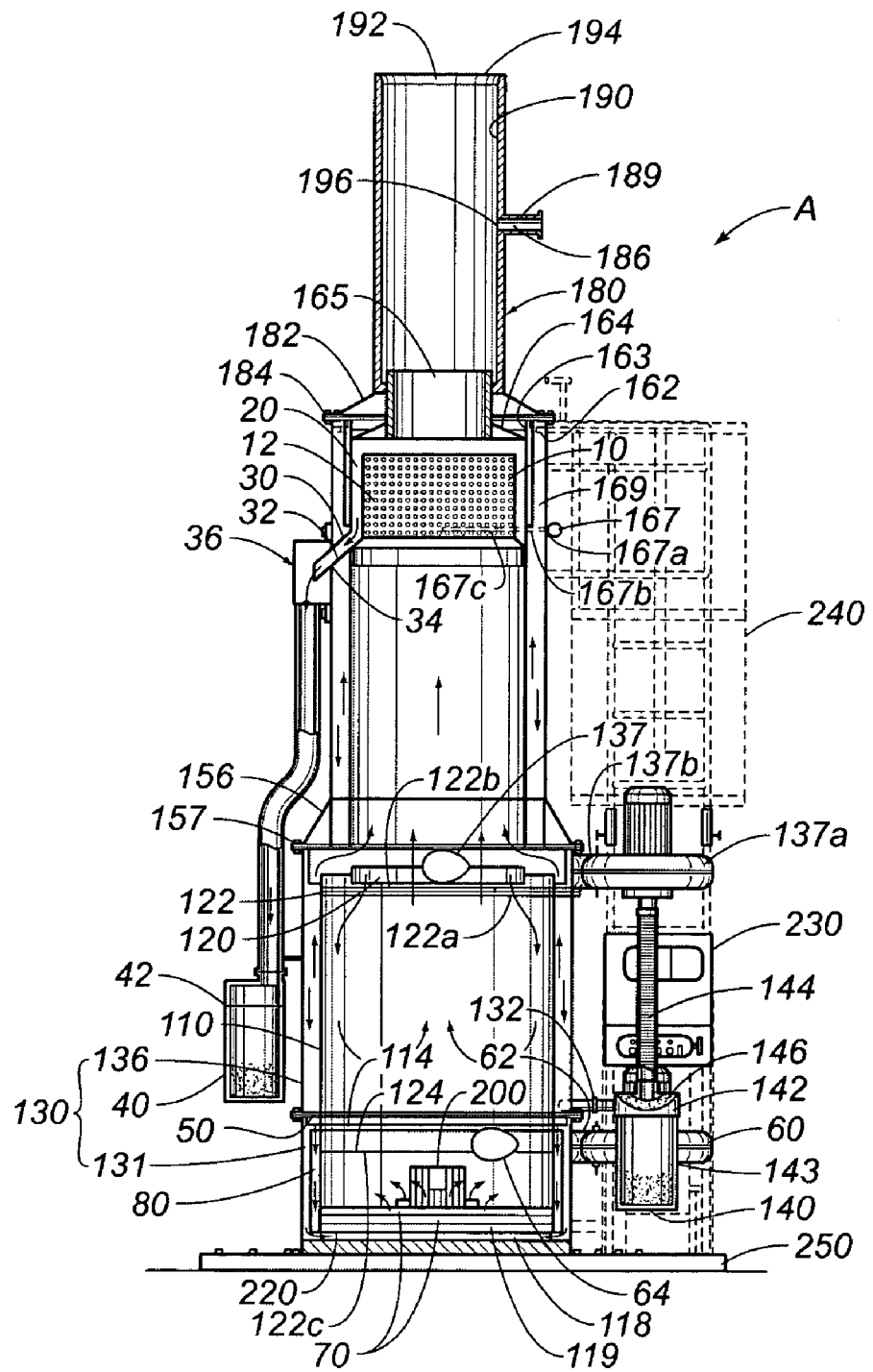
FIG. 8 is a side sectional view illustrating a micro-dust collecting tub and a circulating dust collecting tub of the incinerator in accordance with another embodiment of the present invention.

FIG. 8 is a side sectional view illustrating a micro-dust collecting tub and a circulating dust collecting tub in accordance with another embodiment of the present invention. In the embodiment of FIG. 8, the micro-dust collecting tub 40 is connected to the lower end of the dust guide pipe 36 such that the tub 40 may be disassembled from the at the locking port 34, as desired, and is positioned at a side of the upper portion of the lower body 131 of the external lower tub 130 while being spaced above the base plate 250. The lower end of the dust guide pipe 36 is fixedly supported by the upper body 136 of the external lower tub 130. The middle portion of the dust guide pipe 36 is preferably fabricated using a flexible pipe since the dust guide pipe 36 must be bent at the middle portion.

Figure 10:
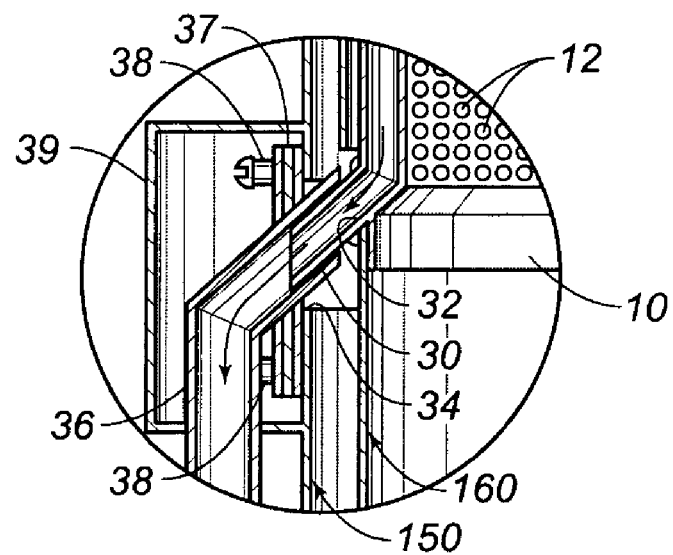
FIG. 10 is a partially enlarged side sectional view illustrating a dust guide pipe of the incinerator in accordance with another embodiment of the present invention.

FIG. 10 is a partially enlarged side sectional view illustrating a dust guide pipe of the incinerator in accordance with another embodiment of the present invention. As shown in the drawing, the upper end of the dust outlet pipe 30 is connected to the dust outlet port 32 of the internal upper tub 160, and is integrated with the port 32 into a single structure through a welding process. The lower end of the dust outlet pipe 30 is inserted into the upper end of the dust guide pipe 36.

In the embodiment of FIG. 10, the upper end of the dust guide pipe 36 is bent upward, and is inserted into the locking port 34 of the external upper tub 150 while creating a clearance between the upper end of the dust guide pipe 36 and the dust outlet pipe 30. The above-mentioned clearance defined between the upper end of the dust guide pipe 36 and the dust outlet pipe 30 is designed such that micro-dust is reliably guided from the internal dust collecting tub 10 into the dust guide pipe 36 even though the internal dust collecting tub 10 is displaced from its original position relative to the upper end of the dust guide pipe 36 due to a thermal expansion of the internal upper tub 160 caused by heat generated from the combustion of wastes in the incinerator "A".

In addition, the upper end of the dust guide pipe 36 is hermetically housed in a casing 39, with a sealing member 37 installed around the upper end of the dust guide pipe 36 such that the sealing member 37 is biased toward the locking port 34 of the external upper tub 150 by a spring 38 to close a gap between the locking port 34 and the dust guide pipe 36. It is thus possible to almost completely prevent a leakage of dust from the locking port 34 of the external upper tub 150 to the atmosphere.

In addition, when it is desired to measure the components of the exhaust gas discharged from the incinerator "A" and/or the operational temperature of the incinerator, the user goes up on a measuring tower 240 installed at a side of the incinerator "A", and installs an exhaust gas sensor (not shown) in the exhaust gas sensor holder 189 set in the sensor fitting holes 186 and 196 and/or a temperature sensor 167 in the sensor fitting holes 167a and 167b. The user measures the components of the exhaust gas of the incinerator "A" using the exhaust gas sensor (not shown) so as to appropriately control the exhaust gas such that the harmful contents of the exhaust gas do not exceed allowable levels. In addition, the user appropriately controls the operating conditions of the incinerator "A" by checking the operating temperature of the incinerator using the temperature sensor 167.

During the incineration of wastes in the incinerator "A", fuel may be controllably sprayed onto the wastes from the nozzles 122b and 122c of the two fuel inlet pipes 122 and 124 set in the upper and lower portions inside the internal lower tub 110 under the condition that flame from the burning of the wastes is continuously stabilized by the flame stabilizer 200. In addition, the flow rate of inlet air into the internal lower tub 110 may be appropriately controlled using the control fan unit 60. Therefore, it is possible to control the incineration rate of the wastes in the incinerator, as desired. In such a case, the user appropriately controls the spraying of fuel onto the wastes and/or appropriately controls the flow rate of inlet air to accomplish complete combustion of the wastes while viewing the interior of the internal lower tub 110 through the window 134a of the slidable ash outlet door 134.

INDUSTRIAL APPLICABILITY

As described above, the present invention provides a high temperature gas reforming cyclo-incinerator used for burning up combustible wastes. The incinerator of the invention has an air cooling structure designed to strongly swirl inlet air in the incinerator prior to discharging the air from the incinerator, thus lengthening circulation time of the inlet air in the incinerator. The incinerator also has a heat shielding structure using a heat shielding plate, designed to prevent heat dissipation from the external surface of the incinerator and protect a user from being burned by dissipated heat. This incinerator also keeps a fire alive until wastes in the incinerator are completely burned up, feeds fuel to completely burn up incompletely burned wastes, and collects and temporarily stores dust-laden air generated from the combustion of the wastes prior to filtering the air to remove dust from the air and discharging clean air to the atmosphere. The incinerator of the present invention also has a dust collecting structure designed to almost completely remove circulating dust and other harmful impurities from air strongly swirling in the incinerator and discharge clean air to the atmosphere. The lower tubs of the incinerator have large diameters capable of effectively burning up a large quantity of wastes at one time, and are provided with a control fan unit separate from a main fan unit, thus controlling the amount of inlet air as desired and allowing a user to control the incineration rate of wastes in the incinerator.

I claim:

1. A high temperature gas reforming cyclo-incinerator comprising:

a cylindrical internal exhaust tub;

an external exhaust tub axially receiving the internal exhaust tub therein;

an internal upper tub having a cylindrical tub body, with an exhaust pipe axially extending upward from said tub body, a shoulder formed at a lower end of said exhaust pipe and integrated with an upper end of the tub body into a single structure, and a plurality of exhaust ports formed around the upper end of a sidewall of said tub body;

an external upper tub connected at an upper end thereof to the external exhaust tub, with an internal support rim formed in said external upper tub to seat a stop rim of the internal upper tub thereon;

an external lower tub connected at an upper end thereof to a lower end of said external upper tub, with an external intake opening formed on a sidewall of the external lower tub and closed by an external intake door having a window, an air inlet port formed on the sidewall of the external lower tub at a position opposite to the external intake opening, an external ash outlet opening formed at a lower portion of the external lower tub and closed by an ash outlet door, and a dust collecting port formed on the lower portion of the external lower tub at a position opposite to the ash outlet opening; and an internal lower tub received in said external lower tub and having an internal ash outlet opening at a position aligned with the external ash outlet opening of the external lower tub, with a plurality of inlet ports formed at upper and lower portions of the internal lower tub respectively connected to a reformed water inlet pipe and first and second fuel inlet pipes, and a water collector set in a lower portion of the internal lower tub;

an internal dust collecting tub opened at a top thereof and set in an upper portion of said internal upper tub such that a dust chamber is defined between the internal dust collecting tub and the internal upper tub, with a plurality of dust collecting ports formed on a sidewall of said internal dust collecting tub, said internal dust collecting tub being mounted at a lower edge thereof to an upper portion of an inner surface of said internal upper tub;

a dust outlet port formed on a sidewall of said internal upper tub at a position corresponding to a lower portion of the dust chamber defined between the internal dust collecting tub and the internal upper tub, thus discharging dust from the dust chamber to the outside of the internal upper tub due to a swirling force of air;

a dust outlet pipe connected to the dust outlet port of the internal upper tub, and extending to the outside of the internal upper tub;

a locking port formed at a sidewall of the external upper tub to hermetically support said dust outlet pipe;

a dust guide pipe hermetically connected to said locking port of the external upper tub to downwardly guide dust discharged from the dust chamber through the dust outlet pipe; and a micro-dust collecting tub connected to the dust guide pipe so as to collect dust guided by the dust guide pipe.

2. A high temperature gas reforming cyclo-incinerator comprising:

a cylindrical internal exhaust tub;

an external exhaust tub axially receiving the internal exhaust tub therein;

an internal upper tub having a cylindrical tub body, with an exhaust pipe axially extending upward from said tub body, a shoulder formed at a lower end of said exhaust pipe and integrated with an upper end of the tub body into a single structure, and a plurality of exhaust ports formed around the upper end of a sidewall of said tub body;

an external upper tub connected at an upper end thereof to the external exhaust tub, with an internal support rim formed in said external upper tub to seat a stop rim of the internal upper tub thereon;

an external lower tub connected at an upper end thereof to a lower end of said external upper tub, with an external intake opening formed on a sidewall of the external lower tub and closed by an external intake door having a window, an air inlet port formed on the sidewall of the external lower tub at a position opposite to the external intake opening, an external ash outlet opening formed at a lower portion of the external lower tub and closed by an ash outlet door, and a dust collecting port formed on the lower portion of the external lower tub at a position opposite to the ash outlet opening; and an internal lower tub received in said external lower tub and having an internal ash outlet opening at a position aligned with the external ash outlet opening of the external lower tub, with a plurality of inlet ports formed at upper and lower portions of the internal lower tub respectively connected to a reformed water inlet pipe and first and second fuel inlet pipes, and a water collector set in a lower portion of the internal lower tub;

a sealing member externally provided around a lower portion of a sidewall of the internal lower tub and mounted to a lower portion of the sidewall of the external lower tub, thus sealing a gap between the internal lower tub and the external lower tub;

a flow rate control fan unit introducing external air into the external lower tub through a first flow rate control port formed at the sidewall of the external lower tub;

a plurality of second flow rate control ports formed at a lower portion of the internal lower tub; and an air guide tub extending outwardly from a lower end of the internal lower tub and bent upward to surround the lower portion of the internal lower tub at a position outside the second flow rate control ports, thus guiding external air from the first flow rate control port to the second flow rate control ports.

3. The high temperature gas reforming cyclo-incinerator according to claim 1, wherein said internal lower tub and said external lower tub have substantially larger diameters than those of the internal upper tub and the external upper tub, respectively, thus increasing waste incineration capacity of the incinerator to burn up a large quantity of wastes at one time.

4. The high temperature gas reforming cyclo-incinerator according to claim 1, wherein a plurality of band-shaped depressions and projections are alternately and horizontally formed around an internal surface of the sidewall of the internal lower tub at an area under the second fuel inlet pipe.

5. The high temperature gas reforming cyclo-incinerator according to claim 3, wherein a plurality of band-shaped depressions and projections are alternately and horizontally formed around an internal surface of the sidewall of the internal lower tub at an area under the second fuel inlet pipe.

6. The high temperature gas reforming cyclo-incinerator according to claim 2, wherein said internal lower tub and said external lower tub have substantially larger diameters than those of the internal upper tub and the external upper tub, respectively, thus increasing waste incineration capacity of the incinerator to burn up a large quantity of wastes at one time.

7. The high temperature gas reforming cyclo-incinerator according to claim 2, wherein a plurality of band-shaped depressions and projections are alternately and horizontally formed around an internal surface of the sidewall of the internal lower tub at an area under the second fuel inlet pipe.

8. The high temperature gas reforming cyclo-incinerator according to claim 7, wherein a plurality of band-shaped depressions and projections are alternately and horizontally formed around an internal surface of the sidewall of the internal lower tub at an area under the second fuel inlet pipe.

* * * * *